United States Patent [19]

Pellerito

[11] 4,193,419
[45] Mar. 18, 1980

[54] CONNECTOR APPARATUS FOR PRESSURIZED LINES

[76] Inventor: Alex Pellerito, 17740 NW. 17th Ave., Miami, Fla. 33054

[21] Appl. No.: 893,483

[22] Filed: Apr. 4, 1978

[51] Int. Cl.² .................. F16K 13/00; F16L 55/10
[52] U.S. Cl. .................. 137/322; 137/614.03; 137/614.05
[58] Field of Search ............ 137/317, 319, 320, 322, 137/223, 233, 234.5, 614.02, 614.03, 614.05; 141/347, 348, 349; 222/400.7, 559; 251/149.6, 149.4, 149.5

[56] References Cited

U.S. PATENT DOCUMENTS

| | | | |
|---|---|---|---|
| 1,575,755 | 3/1926 | Gresser | 141/348 |
| 2,172,311 | 9/1939 | Thomas | 137/322 |
| 2,283,970 | 5/1942 | Buttner | 137/322 |
| 2,309,869 | 2/1943 | Rugh | 137/322 |
| 2,320,042 | 5/1943 | McMahan | 137/319 |
| 2,449,938 | 9/1948 | Hansen | 137/614.03 |
| 2,632,462 | 3/1953 | Selwyn | 137/322 |
| 2,881,011 | 4/1959 | Coughlin | 251/149.4 |
| 3,115,283 | 12/1963 | Lindgren | 137/322 |
| 3,285,274 | 11/1966 | Bouvier | 137/322 |
| 3,329,180 | 7/1967 | Brocklin | 141/349 |
| 3,336,936 | 8/1967 | Mullins | 137/234.5 |
| 3,339,883 | 9/1967 | Drake | 251/149.4 |
| 3,592,439 | 7/1971 | Ritchie, Jr. | 251/149.6 |
| 3,724,489 | 4/1973 | Eross | 137/322 |
| 3,844,530 | 10/1974 | Morrell | 251/149.6 |

FOREIGN PATENT DOCUMENTS

| | | | |
|---|---|---|---|
| 1252443 | 12/1960 | France | 141/348 |
| 581087 | 10/1946 | United Kingdom | 137/614.03 |
| 678556 | 9/1952 | United Kingdom | 137/614.03 |

Primary Examiner—Martin P. Schwadron
Assistant Examiner—G. L. Walton

[57] ABSTRACT

A connector for connecting a first pipe end and a second pipe end, one of which leads from a pressurized source, wherein a normally closed valve member is provided in the pipe from the pressurized source and an axially movable valve stem extends from the pressurized pipe and wherein the valve mechanism includes a spring normally urging the valve stem into a first position in which the valve is closed and the second pipe includes an axially movable member for axially moving the valve stem to open the valve when the pipes are interconnected together and wherein seals are provided and are effective to define a closed flow path through the pipes when the pipes are connected together.

3 Claims, 3 Drawing Figures

CONNECTOR APPARATUS FOR PRESSURIZED LINES

FIELD OF THE INVENTION

This invention relates to a normally closed valve device for interconnecting two pipes under different pressure, or a pipe and a container under different pressures.

BACKGROUND OF THE INVENTION

In the past, there have been numerous problems occasioned when one is required to check the presence or absence of gas under pressure in a container and to charge the container with gas when it does not contain a required amount of gas as determined by a pressure check. This invention is of a connector which includes a normally closed valve and a valve operator which is axially movable to open the valve when another pipe or a pressure checking device is connected to it.

In accordance with the foregoing, it is an object of this invention to provide an improved connector means which is especially adapted for interconnecting two pipes together or a pipe and a vessel with an appropriate fitting so that gas may be charged into the container through the pipe from a source and, when the charging is completed, gas will not escape; and wherein the invention provides a simple and effective means for testing and charging pressurized gaseous materials, such as are used in airconditioning and the like.

In accordance with the foregoing objects, the instant invention will now be described with reference to the accompanying drawings, in which:

DESCRIPTION OF THE PREFERRED EMBODIMENT

Figure 1:
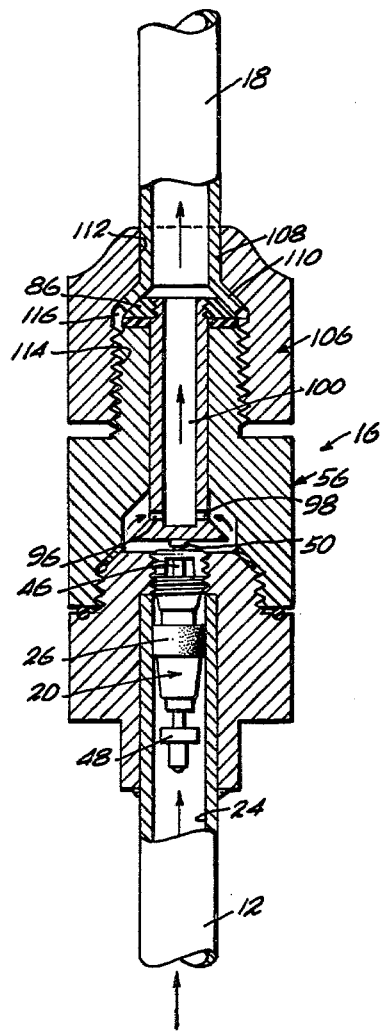
FIG. 1 is a view in cross section of the instant invention and illustrating a completed connection wherein a flowthrough path is defined through the device.
Figure 2:
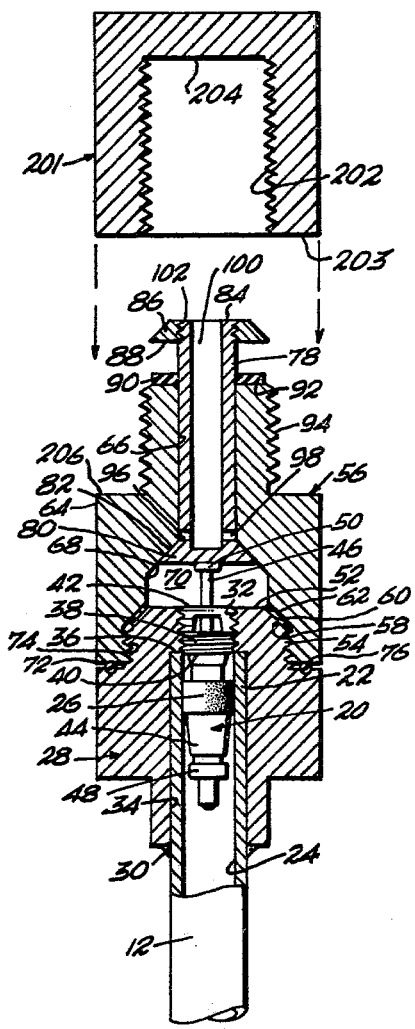
FIG. 2 is a view in cross section of the device in a valve closed condition.
Figure 3:
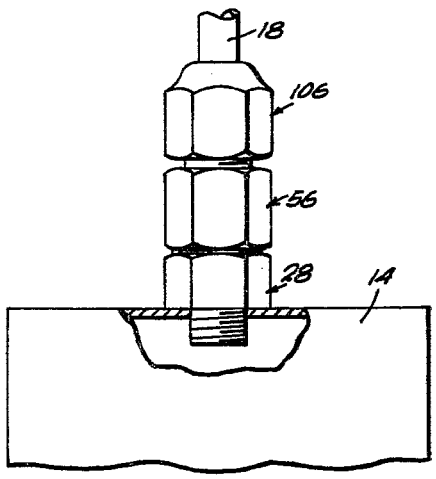
FIG. 3 is a view illustrating the device of FIG. 1 with the elements thereof interconnected and attached to a gas storing body or vessel.

Referring to FIG. 1, the instant invention will now be described. The numeral 12 generally designates a rigid first pipe from a gas container or vessel 14, see FIG. 3, such as a gas under pressure and hence normally seeking to move through the pipe in the direction indicated by the arrowed lines. In FIG. 1, the gas is free to move through the connector means generally designated by the numeral 16 and through the second pipe 18. In FIG. 2, the connection is not completed to the pipe 18 and a normally closed valve mechanism 20 is in blocking relation of the flow path. The valve mechanism 20 is situated in the end 22 of the first pipe 12 and is of the typw often used in the valve stem of pneumatic automobile tires and known as a Schrader valve.

The valve mechanism 20 is sized to extend axially within the bore 24 of the first pipe 12 with the outside diameter of the rubbery annular seal ring 26 in sealing engagement with the inside diameter of the first end of the pipe 12. The valve mechanism is held in place by a keeper ring 28 fixed on the end of the first pipe by welding as at 30. The keeper ring 28 is provided with an axially threaded through bore 32 with a counterbore 34 defining a valve seat 36 at the shoulder thus defined. The counterbore is sized to receive the end of the pipe and the weld 30 is intended to seal the first pipe and the keeper ring together and, as an option, seal means may be provided between the end of the first pipe and the keeper ring.

As is conventional, the valve mechanism is axially advanced by threaded movement into the end of the pipe with the seal ring 26 within the first pipe until the end 40 of the threaded valve body 38 dwells on the shoulder or valve seat 36 defined at the juncture of the threaded bore and counterbore. As is conventional, the valve body is provided with an axial through opening from the upper end 42 to the lower end 44 and a plunger 46 is captivated within the threaded valve body for axial movement only and constrained by a yieldable spring means within an axial through opening in the body and about the plunger to the valve closed position shown in FIG. 3, that is with the seal 48 on the lower end of the plunger 46 in closing relation of the axial path through the valve body and with the upper end 50 of the plunger being at a first predetermined axial location spaced from the upper end 52 of the keeper ring 28. The exterior of the keeper ring is threaded as at 54 for threaded engagement with a fitting 56 now to be described, it being noted, first, that the distally tapered nose surface 58 of the keeper ring is provided to provide a seat upon which an annular seal 60 is arranged to be captivated when the keeper ring 28 is in threaded engagement with a companionately shaped surface 62 of the fitting 56.

Referring now to the fitting 56, it is seen to be composed of a body 64 having an axial through bore 66 and a first counterbore 68 defining an inner chamber 70 of a predetermined axial length and at a predetermined axial location within the body from the end 72 as determined by the axial length of a second threaded counterbore 74 in threaded engagement with the keeper ring. Preferably an O-ring 76 is captivated between the keeper ring and the fitting 56.

A valve operator is provided for axial movement within the chamber 70 to move the plunger of the valve mechanism from the normally closed position shown in FIG. 2 to the valve open position shown in FIG. 1. The valve operator will now be described and, as seen in FIGS. 1 and 2, it is seen to be composed of a slide tube 78 which is slidably captivated within the bore 66 of the body 64 of the fitting 56. The slide tube or valve operator 78 is provided with the first bell shaped closed end 80 captivated in the chamber 70 comprising stop means to limit axial movement between the valve opening and closing positions, and this bell shaped surface has an exterior surface in engagement with the inside surface of the tapered chamfer 82 of the zone between the chamber 70 and the bore 66. The second end 84 of the slide tube 78 or valve operator is exteriorly threaded and a threaded truncated cone-shaped annular ring 86 is secured thereon; and it is at all times exteriorly of the fitting by reason of the axial lengths of the slide tube being greater than the axial length of the bore 66. The underside surface 88 of the truncated cone-shaped annular ring 86 is adapted to be axially moved into confronting engagement with a sealing means or gasket 90 about the slide tube and which dwells on the end 92 of the exteriorly threaded zone 94 of the fitting 56. Adjacent the closed end 80 of the slide tube, radial openings 96 and 98 are provided to communicate with the hollow interior or bore 100 of the slide tube or valve operator 78. The operation of the device will now be described.

In operation, it is seen that when downward pressure is exerted upon the upper end face 102 of the valve operator or slide tube and truncated cone-shaped ring 86, the valve operator will move axially into engagement with the upper end 50 of the plunger 46 of the valve mechanism 20 which will cause the seal 48 on the lower end of the plunger 46 to move axially away from the valve body, opening the interior passageway through the valve body, that is, moving it from the position shown in FIG. 2 to the position shown in FIG. 1. When this occurs, gas will be able to move between the first pipe 12 and the second pipe 18, that is, through the chamber 70, through the radial openings 96 and 98 of the slide tube end and through the bore 100 of the slide tube. Means are provided for axial displacement of the slide tube to permit gas to flow through the device as will now be described; however, it is noted that, as shown in FIG. 2, the normal position of the device is with the valve operator or slide tube in the position shown and urged into that position by the spring energy in the valve mechanism so that the valve mechanism is normally closed.

Referring now to FIG. 1, it is seen that the second pipe 18 is adapted to be connected to the fitting 56 and to this end, a ring 106 is captivated on the end 108 of the second pipe 18 which is flared outwardly at the distal end as at 110 to captivate the ring 106 thereon. The ring is provided with an axial bore 112 sized to receive the end of the pipe and a threaded counterbore 114 to accommodate the threaded end of the fitting 56 and there is defined a chamber 116 between the fitting and the ring 106 with the chamfer between the bore and counterbore defining a seat for the flared end 110 of the pipe 18. It is thus seen that the ring is adapted to be moved into threading engagement with the fitting 56 and, as it is threadably advanced, the flared end 110 of the pipe 18 will engage the exterior surface of the truncated cone-shaped annular ring 86 and as threaded advancement occurs, this will force the valve operator or slide tube downwardly to open a flowthrough path between the pipe 12 and the pipe 18.

It is thus seen that there has been provided a simple and inexpensive connector for use in completing a flowthrough path between bodies of different pressure so that testing and charging apparatus may be conveniently connected thereto. As shown in FIG. 2, a cap 201 with a threaded recess 202 is provided to prevent accidental operation of the valve and escape of gas under pressure. The axial length of the cap 201 between the leading end 203 and the end 204 of the recess is greater than the length from the end 84 of the slide tube or valve operator, when the valve is closed, to the abutment shoulder 206. It is thus seen that any exterior pressure applied on the cap will not result in the valve becoming opened.

What is claimed is:

1. For a passageway, a normally closed valve device sized to companionately mate with and to be installed in the passageway, said valve device comprising:

a valve mechanism including a valve stem having a terminal end and a valve body, said stem normally extending axially away from the body, said valve mechanism being effective on axial movement of the stem toward the body to open a fluid flow path through the valve mechanism, nipple means to hold the valve mechanism in closing relation of the passageway;

a fitting with a first axial through opening and said fitting having a first end and a second end, said fitting including means to connect to the means to hold the valve mechanism in closing relation of the passageway; and said first end of said fitting being in fluid tight engagement with said means to hold; said fitting having an internal axially extending operating recess having a first end and a second end and extending axially away from said first end of said fitting, and said operating recess being about said stem;

said terminal end of said stem being normally at a first predetermined valve closed axial location within the recess spaced axially from the second recess end and movable in a direction axially away from the second end of the recess toward the first end of the recess to a second predetermined valve open axial location;

a valve operator of an axial length longer than the axial length of the through opening of the fitting from the recess to the second end of the fitting; said valve operator having a first end zone and a second end zone and comprising a tubular length defining a through passageway between the ends said first end zone defines a valve means, and said recess being in fluid communication with said through passageway;

said tubular length being sized for axial slidable movement in said axial through opening of said fitting and the first end zone of the valve operator being at all times in use in the recess between the second end of the recess and the first predetermined axial location and adjacent the terminal end of said valve stem, and the second end zone of the valve operator being at all times in use exterior of the second end of the fitting;

means slidably captivating the first end zone of the valve operator in the recess for sliding axial movement of the first end zone of the valve operator in the recess between the first and second recess ends to move the valve stem toward the valve body axially from said first predetermined axial location to said second predetermined axial location to open the valve mechanism, said recess and said axial through passageway being in fluid communication with one another when said second end zone of said valve operator is between said first axial location and said second axial location;

stop means captivating and limiting axial movement of the first end zone of the valve operator to a range of movement in said recess including the axial distance between said first and said second predetermined axial locations and said stop means being defined by the second end of said fitting and said second end zone;

guard means and orienting means on the second end of the fitting to mate with an axially movable valve operating member to apply axial force to move the operator toward the valve stem to open the valve mechanism opening a flowthrough path through said opening which is normally closed by said valve mechanism;

seal means between said fitting and said means to hold the valve mechanism in closing relation of the opening;

seal means are provided about said valve operator between said second end zone and the second end of said fitting; and pipe means included in said device and said means to hold is fixedly secured to said pipe means and said passageway comprises an opening in said pipe means.

2. The device as set forth in claim 1 wherein said means to hold the valve mechanism in closing relation of an opening comprises a nut circumposed about said opening and defining a valve seat comprising a portion of said opening and thread means along said opening extending axially and said valve body including exterior thread means sized to mate with said thread means for threaded engagement therewith with said valve stem extending axially from said nut.

3. The device as set forth in claim 1 wherein removable cap means on the second end of the fitting to protectively house the second end of the valve operator when said first end zone is in said fitting recess at said predetermined axial position to guard against inadvertent application of axial force on the second end of the valve operator to open the valve mechanism.

* * * * *